(12) United States Patent
Chen et al.

(10) Patent No.: US 7,096,204 B1
(45) Date of Patent: Aug. 22, 2006

(54) ELECTRONIC COMMERCE SYSTEM

(75) Inventors: Liqun Chen, Bristol (GB); Boris Balacheff, Bristol (GB); Roelf du Toit, Eldoraigne (ZA); Siani Lynne Pearson, Bristol (GB); David Chan, Monte Sereno, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 466 days.

(21) Appl. No.: 10/110,280

(22) PCT Filed: Oct. 6, 2000

(86) PCT No.: PCT/GB00/03861

§ 371 (c)(1),
(2), (4) Date: Aug. 23, 2002

(87) PCT Pub. No.: WO01/27821

PCT Pub. Date: Apr. 19, 2001

(30) Foreign Application Priority Data

Oct. 8, 1999 (GB) .................................. 9923804.0

(51) Int. Cl.
*G06Q 99/00* (2006.01)

(52) U.S. Cl. .............................. 705/74; 705/25; 705/65; 705/67; 705/41; 713/150; 713/155; 713/156; 713/159

(58) Field of Classification Search .................. 705/26, 705/74, 65, 67, 41; 713/150, 155, 156, 159
See application file for complete search history.

(56) References Cited

U.S. PATENT DOCUMENTS

| | | | |
|---|---|---|---|
| 5,361,359 A | 11/1994 | Tajalli et al. ................ 395/700 |
| 5,563,998 A | 10/1996 | Yaksich ....................... 395/149 |
| 5,664,207 A | 9/1997 | Crumpler et al. ............ 395/766 |
| 5,758,257 A | 5/1998 | Herz et al. ...................... 455/2 |
| 5,805,712 A | 9/1998 | Davis ........................... 380/50 |
| 5,890,152 A | 3/1999 | Rapaport et al. ............... 707/6 |
| 6,212,634 B1 | 4/2001 | Geer, Jr. et al. ............ 713/156 |
| 6,330,670 B1 | 12/2001 | England et al. ................. 713/2 |
| 2003/0140007 A1* | 7/2003 | Kramer et al. ................ 705/40 |
| 2004/0002903 A1* | 1/2004 | Stolfo et al. .................. 705/26 |
| 2005/0033659 A1* | 2/2005 | Zucker et al. ................ 705/26 |

FOREIGN PATENT DOCUMENTS

| | | |
|---|---|---|
| EP | 0501697 | 9/1992 |
| EP | 0 971 303 A2 | 1/2000 |

(Continued)

OTHER PUBLICATIONS

U.S. Appl. No. 10/208,716, filed Jul. 29, 2002, Pearson.

(Continued)

*Primary Examiner*—James P. Trammel
*Assistant Examiner*—Jalatee Worjloh

(57) ABSTRACT

A method of brokering a transaction between a consumer and a vendor by a broker, wherein the consumer, the broker and the vendor are all attached to a public network, the consumer having a secure token containing a true consumer identity. The method comprising the steps of: the consumer obtaining a temporary identity from the broker by using the true consumer identity from the secure token; the consumer selecting a purchase to be made from the vendor; the consumer requesting the purchase from the vendor and providing the temporary identity to the vendor; the vendor requesting transaction authorisation from the broker by forwarding the request and the temporary identity to the broker; the broker matching the temporary identity to a current list of temporary identities, and obtaining the true consumer identity; the broker providing authorisation for the transaction based on transaction details and true consumer identity.

20 Claims, 8 Drawing Sheets

FOREIGN PATENT DOCUMENTS

| | | |
|---|---|---|
| FR | 2733068 | 10/1996 |
| WO | 94/23383 A1 | 10/1994 |
| WO | 99/62012 A1 | 12/1999 |
| WO | 00/04673 | 1/2000 |
| WO | 00/48063 | 8/2000 |
| WO | 00/73879 | 12/2000 |
| WO | 01/31841 A | 5/2001 |
| WO | 01/43033 A1 | 6/2001 |
| WO | 01/46876 A2 | 6/2001 |
| WO | 01/54346 | 7/2001 |

OTHER PUBLICATIONS

U.S. Appl. No. 10/241,893, filed Sep. 12, 2002, Pearson.

Anderson, R. et al., "Tamper Resistance—a Cautionary Note," *Proceedings of the Second USENIX Workshop on Electronic Commerce*, pp. 1-11, Nov. 1996.

Anderson, R. and Markus Kuhn, "Tamper Resistance—a Cautionary Note," 16 pages, located at Internet address <www.cl.cam.ac.uk/~mgk25/tamper.html> 1996.

Chaum, E. "Security Without Identification: Transaction Systems to Make Big Brother Obsolete," *Communications of the ACM*, vol. 28, No. 10, pp. 1030-1044, Oct. 1985.

Intel, "Wired for Management Baseline specification v2.0," *Boot Integrity Services Application Programming Interface Version 1.0*, 64 pages, Dec. 28, 1998.

Yee, B., "Using Secure Coprocessors," Doctoral thesis—Carnegie Mellon University, pp. 1-94 (May 1994).

"Building a Foundation of Trust in the PC," *Trusted Computing Platform Alliance*, pp. 1-7 (Jan. 2000).

*Trusted Computing Platform Alliance (TCPA), Main Specification*, Version 1.0, pp. 1-284 (2000).

Neuman, B.C., et al., "Kerberos: An Authentication Service for Computer Networks," *IEEE Communcations Magazine*, vol. 32, No. 9, pp. 33-38, Sep. 1994.

Tygar, J.D., "Atomicity in Electronic Commerce," *Proceedings of the Fifteenth Annual ACM Symposium on Principles of Distributed Computing*, pp. 8-26, May 1996.

"Information technology-Security techniques-Entity Authentication—Part 3: Mechanisms using digital signature techniques," *ISO/IEC 9798-3*, 6 pages, 1998.

"Information technology-Security techniques-Key management—Part 3: Mechanisms using asymmetric techniques," *ISO/IEC 11770-3*, pp. 1-23 and Annexes A-D, 1999.

\* cited by examiner

ELECTRONIC COMMERCE SYSTEM

The subject matter of the present application may also be related to the following U.S. patent applications: "Trusted Identities on a Trusted Computing Platform," Ser. No. 10/208,716, filed Jul. 29, 2002; and "Method and Apparatus for User Profiling," Ser. No. 10/241,893, filed Sep. 12, 2002.

This invention relates to a system for enacting electronic commerce.

Purchasing goods using a public network, such as the Internet, plays an increasingly important role in modern society, and necessarily involves the establishment of the appropriate business relationships amongst consumers, vendors and authorisation providers.

Existing online vendors use the model described in FIG. 8. This is described in greater detail below, but in summary the consumer uses the Internet Service Provider (ISP) as a connection provider and connects to the vendor's online store. The vendor is connected to the consumer's bank through a payment gateway. The payment gateway is a broker—it is used to authorise transactions and update the consumer's account. In this model the vendor will not ship the goods until it receives payment, made with a debit or credit card, which needs to be verified by or on behalf of the vendor. The distribution channel is, typically, conventional mail.

The following problems exist apply to the existing model:
certain levels of truste exist between the consumer and the vendor, and between vendor and authorising bank, but these are not sufficient to satisfy all security concerns;
the consumer must to trust the platform from which the transaction is initiated, so he or she is only likely to use a platform personal to him or her;
the consumer must reveal identity and card details to the vendor;
the amount of effort and money needed to set up a payment gateway limits the number of vendors willing to provide an online store; and
electronic goods such as software, music and videos typically need to be sent through the conventional distribution channel because of the lack of mutual trust.

Accordingly, there is provided a method of brokering a transaction between a consumer and a vendor by a broker, wherein the consumer, the broker and the vendor are all attached to a public network, the consumer having a secure token containing a true consumer identity, the method comprising the steps of: the consumer obtaining a temporary identity from the broker by using the true consumer identity from the secure token; the consumer selecting a purchase to be made from the vendor; the consumer requesting the purchase from the vendor and providing the temporary identity to the vendor; the vendor requesting transaction authorisation from the broker by forwarding the request and the temporary identity to the broker; the broker matching the temporary identity to a current list of temporary identities, and obtaining the true consumer identity; the broker providing authorisation for the transaction based on transaction details and true consumer identity.

To address one or more of the problems of the prior art, the present inventors have proposed the method above. Embodiments of the method reduce security risks, and appropriate business relationships between consumers and vendors are set up through the use of ISPs as trusted brokers. Typically, the relationship involves a trust relationship between the broker and the consumers, and between the broker and the vendors, but not (directly) between the vendors and the consumers. Preferred embodiments of the invention involve mutual authentication and integrity checks. Particularly preferred embodiments utilise a novel method of separating payment and distribution of goods. The (financial) identity of the consumer is needed for payment, but this is revealed only to the broker and not the vendor. This does not prevent delivery of goods—electronic goods can simply be downloaded, but physical goods can be sent to the consumer's delivery address, which can be sent without compromising his financial data.

Particularly preferred embodiments of the invention make use of trusted computing platform technology (by which operation of a computing platform can be made demonstrably reliable to a user or other interacting party) in order to develop verifiable trust relationships between consumers and their platforms, between consumer and ISP, and between ISPs and vendors. Trusted computing platforms are described in detail below.

In a preferred method, each consumer needs only one contract with an ISP, and with this contract he or she can buy goods from many different vendors. Each vendor also would need only one contract with the ISP, and could with this contract sell goods (including downloadable electronic goods) or services to many different consumers.

In arrangements in accordance with the present invention, the authorisation gateway moves to the ISP and thus cost and effort for vendors is reduced. In preferred arrangements, the purchase procedure does not involve revealing any of the consumer's secret information to the vendor. The ISP, acting as broker, preferably controls billing to the consumer and also controls access to different services by adopting a security policy agreed by all parties.

Embodiments of the present invention will now be described, by way of example, with reference to the accompanying drawings, in which.

Figure 1:
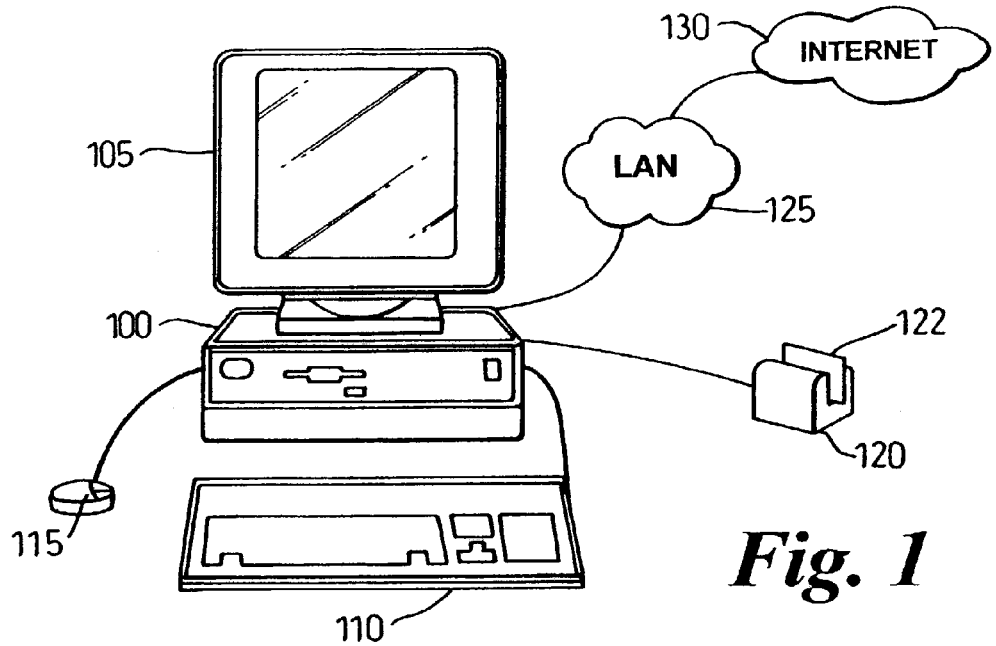
FIG. 1 shows elements of a host computer appropriate for use as a trusted client platform in embodiments of the invention.

An embodiment of the present invention will now be described, by way of example. A part of the system of this preferred embodiment is a client platform will be described which contains a trusted component, the trusted component allowing secure and reliable interaction with the client platform by users or other parties communicating with the client platform. Such a trusted component is described below, but is more fully described in the applicant's copending International Patent Application No. PCT/GB 00/00528 entitled "Trusted Computing Platform" filed on 15 Feb. 2000 and incorporated by reference herein. The trusted component in the client platform also controls the client platform display, so the user can be confident that what is seen on the display has not been subverted by an unauthorised process operating on the client platform. This aspect of the trusted component is also described below, but is more fully described in the applicant's copending International Patent Application No. PCT/GB 00/01996 entitled "System for Digitally Signing a Document" filed on 25 May 2000 and incorporated by reference herein. The system also employs in preferred embodiments a trusted token personal to a user—in the embodiment described in detail here, the trusted token is a user smart card. In addition, in the embodiment described, not only the client platform but also the server contains a trusted component (though this does need to have trusted display functionality).

Certain elements of the system—the trusted component, including trusted display functionality, and the user smart card—will now be described in detail with reference to FIGS. 1 to 7. The skilled person will appreciate that in the context of the present invention, the specific form of trusted computing platform (and trusted component), trusted display and smart card are not critical, and may be modified without departing from the scope of the invention as claimed. In the present invention, use of such a computing platform is indeed strongly preferred, but not essential.

To achieve a trusted computing platform, there is incorporated into the computing platform a physical trusted device whose function is to bind the identity of the platform to reliably measured data that provides an integrity metric of the platform. The trusted device may also (as is described below) act as a trusted display processor. The trusted display processor (or a device with similar properties) is associated with video data at a stage in the video processing beyond the point where data can be manipulated by standard host computer software. This allows the trusted display processor to display data on a display surface without interference or subversion by the host computer software. Thus, the trusted display processor can be certain what image is currently being displayed to the user. The identity and the integrity metric are compared with expected values provided by a trusted party (TP) that is prepared to vouch for the trustworthiness of the platform. If there is a match, the implication is that at least part of the platform is operating correctly, depending on the scope of the integrity metric.

A user verifies the correct operation of the platform before exchanging other data with the platform. A user does this by requesting the trusted device to provide its identity and an integrity metric. (Optionally the trusted device will refuse to provide evidence of identity if it itself was unable to verify correct operation of the platform.) The user receives the proof of identity and the identity metric, and compares them against values which it believes to be true. Those proper values are provided by the TP or another entity that is trusted by the user. If data reported by the trusted device is the same as that provided by the TP, the user trusts the platform. This is because the user trusts the entity. The entity trusts the platform because it has previously validated the identity and determined the proper integrity metric of the platform.

Once a user has established trusted operation of the platform, he exchanges other data with the platform. For a local user, the exchange might be by interacting with some software application running on the platform. For a remote user, the exchange might involve a secure transaction. In either case, the data exchanged is 'signed' by the trusted device. The user can then have greater confidence that data is being exchanged with a platform whose behaviour can be trusted.

The trusted device uses cryptographic processes but does not necessarily provide an external interface to those cryptographic processes. Also, a most desirable implementation would be to make the trusted device tamperproof, to protect secrets by making them inaccessible to other platform functions and provide an environment that is substantially immune to unauthorised modification. Since tamper-proofing is impossible, the best approximation is a trusted device that is tamper-resistant, or tamper-detecting. The trusted device, therefore, preferably consists of one physical component that is tamper-resistant.

Techniques relevant to tamper-resistance are well known to those skilled in the art of security. These techniques include methods for resisting tampering (such as appropriate encapsulation of the trusted device), methods for detecting tampering (such as detection of out of specification voltages, X-rays, or loss of physical integrity in the trusted device casing), and methods for eliminating data when tampering is detected. Further discussion of appropriate techniques can be found at http://www.cl.cam.ac.uk/~mgk25/tamper.html. It will be appreciated that, although tamper-proofing is a most desirable feature of the present invention, it does not enter into the normal operation of the invention and, as such, is beyond the scope of the present invention and will not be described in any detail herein.

The trusted device is preferably a physical one because it must be difficult to forge. It is most preferably tamper-resistant because it must be hard to counterfeit. It typically has an engine capable of using cryptographic processes because it is required to prove identity, both locally and at a distance, and it contains at least one method of measuring some integrity metric of the platform with which it is associated.

FIG. 1 illustrates a host computer system in which the host computer is (for example) a Personal Computer, or PC, which operates under the Windows NT™ operating system. According to FIG. 1, the host computer 100 is connected to a visual display unit (VDU) 105, a keyboard 110, a mouse 115 and a smartcard reader 120, and a local area network (LAN) 125, which in turn is connected to the Internet 130. Herein, the smartcard reader is an independent unit, although it may be an integral part of the keyboard. The VDU, keyboard, mouse, and trusted switch can be thought of as the human/computer interface (HCI) of the host computer. More specifically, the display, when operating under trusted control, as will be described, can be thought of as part of a 'trusted user interface'. FIG. 1 also illustrates a smartcard 122 for use in the present embodiment as will be described.

Figure 2:
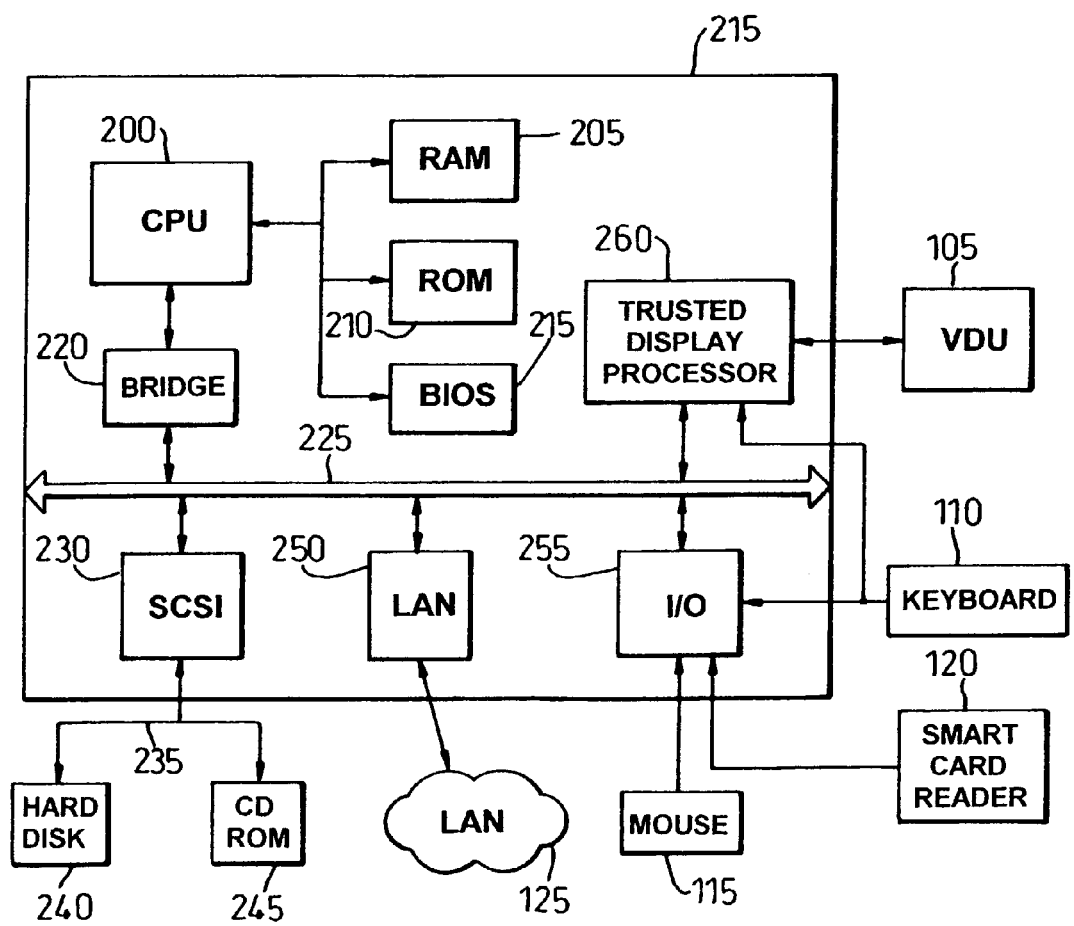
FIG. 2 shows the hardware architecture of the host computer of FIG. 1.

FIG. 2 shows a hardware architecture of the host computer of FIG. 1.

According to FIG. 2, the host computer 100 comprises a central processing unit (CPU) 200, or main processor, connected to main memory, which comprises RAM 205 and ROM 210, all of which are mounted on a motherboard 215 of the host computer 100. The CPU in this case is a Pentium™ processor. The CPU is connected via a PCI (Peripheral Component Interconnect) bridge 220 to a PCI bus 225, to which are attached the other main components of the host computer 100. The bus 225 comprises appropriate control, address and data portions, which will not be described in detail herein. For a detailed description of Pentium processors and PCI architectures, which is beyond the scope of the present description, the reader is referred to the book, "The Indispensable PC Hardware Handbook", 3rd Edition, by Hans-Peter Messmer, published by Addison-Wesley, ISBN 0-201-40399-4. Of course, the present embodiment is in no way limited to implementation using Pentium processors, Windows™ operating systems or PCI buses.

The other main components of the host computer 100 attached to the PCI bus 225 include: a SCSI (small computer system interface) adaptor connected via a SCSI bus 235 to a hard disk drive 2600 and a CD-ROM drive 2605; a LAN (local area network) adaptor 250 for connecting the host computer 100 to a LAN 125, via which the host computer 100 can communicate with other host computers (not shown), such as file servers, print servers or email servers, and the Internet 130; an 10 input/output) device 225, for attaching the keyboard 110, mouse 115 and smartcard reader 120; and a trusted device 260 (which incorporates the trusted display processor function). The trusted display processor handles all standard display functions plus a number of further tasks, which will be described in detail below. 'Standard display functions' are those functions that one would normally expect to find in any standard host computer 100, for example a PC operating under the Windows NT™ operating system, for displaying an image associated with the operating system or application software.

All the main components, in particular the trusted device 260, are preferably also integrated onto the motherboard 215 of the host computer 100, although, sometimes, LAN adapters 250 and SCSI adapters 230 can be of the plugin type.

Typically, in a personal computer the BIOS program is located in a special reserved memory area 215, the upper 64K of the first megabyte of the system memory (addresses FØØØh to FFFFh), and the main processor is arranged to look at this memory location first, in accordance with an industry wide standard.

The significant difference between the platform and a conventional platform is that, after reset, the main processor is initially controlled by the trusted device, which then hands control over to the platform-specific BIOS program, which in turn initialises all input/output devices as normal. After the BIOS program has executed, control is handed over as normal by the BIOS program to an operating system program, such as Windows NT™, which is typically loaded into main memory from a hard disk drive.

Clearly, this change from the normal procedure requires a modification to the implementation of the industry standard, whereby the main processor 200 is directed to address the trusted component (also described as trusted device) 260 to receive its first instructions. This change may be made simply by hard-coding a different address into the main processor 200. Alternatively, the trusted device 260 may be assigned the standard BIOS program address, in which case there is no need to modify the main processor configuration.

It is highly desirable for the BIOS boot block to be contained within the trusted device 260. This prevents subversion of the obtaining of the integrity metric (which could otherwise occur if rogue software processes are present) and prevents rogue software processes creating a situation in which the BIOS (even if correct) fails to build the proper environment for the operating system.

Although, in the preferred form to be described, the trusted device 260 is a single, discrete component, it is envisaged that the functions of the trusted device 260 may alternatively be split into multiple devices on the motherboard, or even integrated into one or more of the existing standard devices of the platform. For example, it is feasible to integrate one or more of the functions of the trusted device into the main processor itself, provided that the functions and their communications cannot be subverted. This, however, would probably require separate leads on the processor for sole use by the trusted functions. Additionally or alternatively, although in the present embodiment the trusted device is a hardware device that is adapted for integration into the motherboard 215, it is anticipated that a trusted device may be implemented as a 'removable' device, such as a dongle, which could be attached to a platform when required. Whether the trusted device is integrated or removable is a matter of design choice. However, where the trusted device is separable, a mechanism for providing a logical binding between the trusted device and the platform should be present.

After system reset, the trusted device 260 performs a secure boot process to ensure that the operating system of the platform 100 (including the system clock and the display on the monitor) is running properly and in a secure manner. During the secure boot process, the trusted device 260 acquires an integrity metric of the computing platform 100. The trusted device 260 can also perform secure data transfer and, for example, authentication between it and a smart card via encryption/decryption and signature/verification. The trusted device 260 can also securely enforce various security control policies, such as locking of the user interface. Moreover, in this arrangement the trusted device 260 also acts as a trusted display processor, providing the standard display functions of a display processor and the extra, non-standard functions for providing a trusted user interface.

Figure 3:
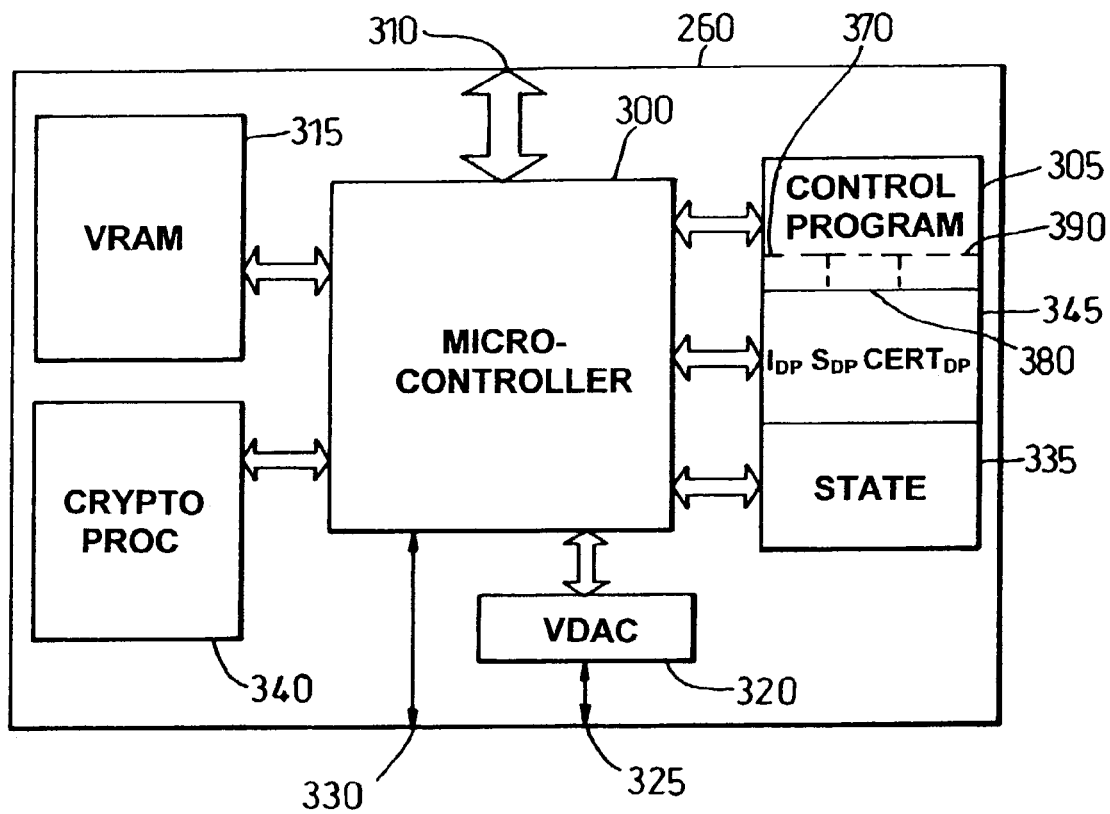
FIG. 3 shows the elements of a trusted device suitable for use in embodiments of the invention.

According to FIG. 3, the trusted device 260 comprises:
- a controller 300;
- non-volatile memory 305, for example flash memory, containing respective control program instructions (i.e. firmware) for controlling the operation of the microcontroller 300 (alternatively, the trusted device 260 could be embodied in an ASIC, which would typically provide greater performance and cost efficiency in mass production, but would generally be more expensive to develop and less flexible)—the control program includes a measurement function 370 for acquiring the integrity metric from the computing platform and an authentication function 380 for authenticating a smart card (or other trusted component);
- an interface 310 for connecting the trusted device 260 to the PCI bus for receiving information including image data (i.e. graphics primitives) from the CPU 200 and also trusted image data from the smartcard 122, as will be described;
- frame buffer memory 315, which comprises sufficient VRAM (video RAM) in which to store at least one full image frame (a typical frame buffer memory 315 is 1–2 Mbytes in size, for screen resolutions of 1280×768 supporting up to 16.7 million colours);
- a video DAC (digital to analogue converter) 320 for converting pixmap data into analogue signals for driving the (analogue) VDU 105, which connects to the video DAC 320 via a video interface 325;
- volatile memory 335, for example DRAM (dynamic RAM) or more expensive SRAM (static RAM), for storing state information, particularly received cryptographic keys, and for providing a work area for the microcontroller 300;
- a cryptographic processor 340, comprising hardware cryptographic accelerators and/or software, arranged to provide the trusted device 260 with a cryptographic identity and to provide authenticity, integrity and confidentiality, guard against replay attacks, make digital signatures, and use digital certificates, as will be described in more detail below; and non-volatile memory 345, for example flash memory, for storing an identifier IDP of the trusted device 260 (for example a simple text string name—this can be used for indexing and labelling of data relevant to the trusted device, but is in itself insufficient to prove the identity of the platform under trusted conditions), a private key SDP of the trusted device 260, a certificate $Cert_{DP}$ signed and provided by a trusted third party certification agency (TP), such as VeriSign Inc., which binds the trusted device 260 with a signature public-private key pair and a confidentiality public-private key pair and includes the corresponding public keys of the trusted device 260.

A certificate typically contains such information, but not the public key of the CA. That public key is typically made available using a 'Public Key Infrastructure' (PKI). Operation of a PKI is well known to those skilled in the art of security.

The certificate $Cert_{DP}$ is used to supply the public key of the trusted device 260 to third parties in such a way that third parties are confident of the source of the public key and that the public key is a part of a valid public-private key pair. As such, it is unnecessary for a third party to have prior knowledge of, or to need to acquire, the public key of the trusted device 260.

The certificate $T_P$ (or, optionally, a further certificate) contains not only the public key of the trusted device 260 but also an authenticated value of the platform integrity metric measured by the trusted party (TP). In later communications sessions, a user of the platform 100 can verify the integrity of the platform 100 by comparing the acquired integrity metric with the authentic integrity metric in the certificate. If there is a match, the user can be confident that the platform 10 has not been subverted. Knowledge of the TP's generally-available public key enables simple verification of the certificate.

The trusted device 260 is equipped with at least one method of reliably measuring or acquiring the integrity metric of the computing platform 100 with which it is associated. In the present embodiment, the integrity metric is acquired by the measurement function 370 by generating a digest of the BIOS instructions in the BIOS memory. Such an acquired integrity metric, if verified as described above, gives a potential user of the platform 100 a high level of confidence that the platform 100 has not been subverted at a hardware, or BIOS program, level. Other known processes, for example virus checkers, will typically be in place to check that the operating system and application program code has not been subverted.

The measurement function 370 has access to: non-volatile memory 305,345 for storing a hash program 390 and a private key SDP of the trusted device 260, and volatile memory 335 for storing acquired integrity metric in the form of a digest 361. In appropriate embodiments, the volatile memory 335 may also be used to store the public keys and associated ID labels 360a–360n of one or more authentic smart cards 122 that can be used to gain access to the platform 100.

In one preferred implementation, as well as the digest, the integrity metric includes a Boolean value, which is stored in volatile memory 335 by the measurement function 370, for reasons that will become apparent.

Figure 4:
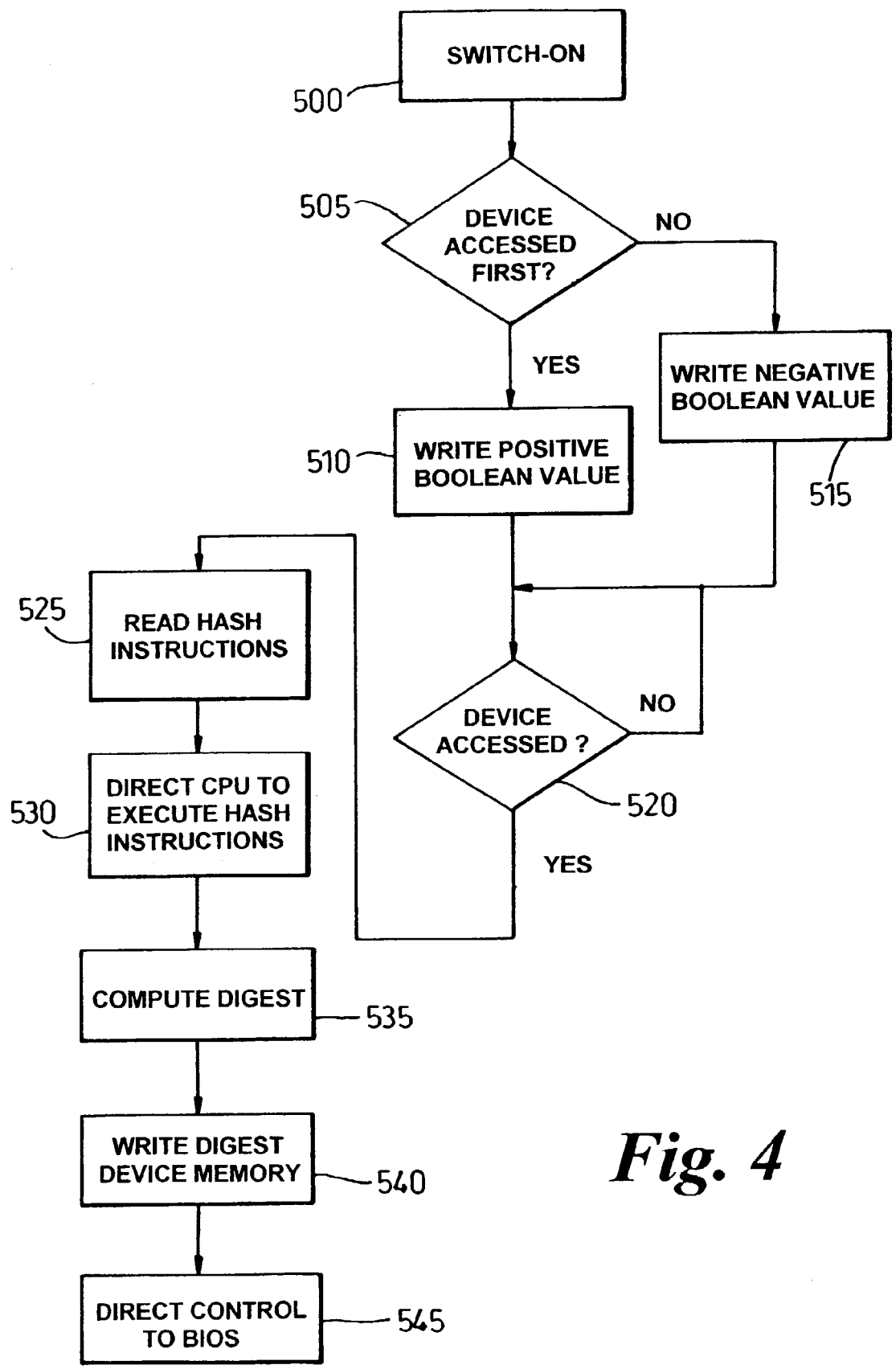
FIG. 4 shows a preferred process for obtaining an integrity metric.

A preferred process for acquiring an integrity metric will now be described with reference to FIG. 4.

In step 500, at switch-on, the measurement function 370 monitors the activity of the main processor 200 on the PCI bus 225 to determine whether the trusted device 260 is the first memory accessed. Under conventional operation, a main processor would first be directed to the BIOS memory first in order to execute the BIOS program. However, in accordance with the arrangement shown, the main processor 200 is directed to the trusted device 260, which acts as a memory. In step 505, if the trusted device 260 is the first memory accessed, in step 510, the measurement function 370 writes to volatile memory 335 a Boolean value which indicates that the trusted device 260 was the first memory accessed. Otherwise, in step 515, the measurement function writes a Boolean value which indicates that the trusted device 260 was not the first memory accessed.

In the event the trusted device 260 is not the first memory accessed, there is of course a chance that the trusted device 260 will not be accessed at all. This would be the case, for example, if the main processor 200 were manipulated to run the BIOS program first. Under these circumstances, the platform would operate, but would be unable to verify its integrity on demand, since the integrity metric would not be available. Further, if the trusted device 260 were accessed after the BIOS program had been accessed, the Boolean value would clearly indicate lack of integrity of the platform.

In step 520, when (or if) accessed as a memory by the main processor 200, the main processor 200 reads the stored native hash instructions 390 from the measurement function 370 in step 525. The hash instructions 390 are passed for processing by the main processor 200 over the data bus 225. In step 530, main processor 200 executes the hash instructions 390 and uses them, in step 535, to compute a digest of the BIOS memory 215, by reading the contents of the BIOS memory 215 and processing those contents according to the hash program. In step 540, the main processor 200 writes the computed digest 361 to the appropriate non-volatile memory location 335 in the trusted device 260. The measurement function 370, in step 545, then calls the BIOS program in the BIOS memory 215, and execution continues in a conventional manner.

Clearly, there are a number of different ways in which the integrity metric may be calculated, depending upon the scope of the trust required. The measurement of the BIOS program's integrity provides a fundamental check on the integrity of a platform's underlying processing environment. The integrity metric should be of such a form that it will enable reasoning about the validity of the boot process—the value of the integrity metric can be used to verify whether the platform booted using the correct BIOS. Optionally, individual functional blocks within the BIOS could have their own digest values, with an ensemble BIOS digest being a digest of these individual digests. This enables a policy to state which parts of BIOS operation are critical for an intended purpose, and which are irrelevant (in which case the individual digests must be stored in such a manner that validity of operation under the policy can be established).

Other integrity checks could involve establishing that various other devices, components or apparatus attached to the platform are present and in correct working order. In one example, the BIOS programs associated with a SCSI controller could be verified to ensure communications with peripheral equipment could be trusted. In another example, the integrity of other devices, for example memory devices or co-processors, on the platform could be verified by enacting fixed challenge/response interactions to ensure consistent results. Where the trusted device 260 is a separable component, some such form of interaction is desirable to provide an appropriate logical binding between the trusted device 260 and the platform. Also, although in the present embodiment the trusted device 260 utilises the data bus as its main means of communication with other parts of the platform, it is feasible to provide alternative communications paths, such as hard-wired paths or optical paths—such an arrangement is described in greater detail below with reference to FIGS. 8 and 9. Further, although in the present embodiment the trusted device 260 instructs the main processor 200 to calculate the integrity metric in other embodiments, the trusted device itself is arranged to measure one or more integrity metrics.

Preferably, the BIOS boot process includes mechanisms to verify the integrity of the boot process itself. Such mechanisms are already known from, for example, Intel's draft "Wired for Management baseline specification v 2.0-BOOT Integrity Service", and involve calculating digests of software or firmware before loading that software or firmware. Such a computed digest is compared with a value stored in a certificate provided by a trusted entity, whose public key is known to the BIOS. The software/firmware is then loaded only if the computed value matches the expected value from the certificate, and the certificate has been proven valid by use of the trusted entity's public key. Otherwise, an appropriate exception handling routine is invoked.

Optionally, after receiving the computed BIOS digest, the trusted device 260 may inspect the proper value of the BIOS digest in the certificate and not pass control to the BIOS if the computed digest does not match the proper value. Additionally, or alternatively, the trusted device 260 may inspect the Boolean value and not pass control back to the BIOS if the trusted device 260 was not the first memory accessed. In either of these cases, an appropriate exception handling routine may be invoked.

Figure 5:
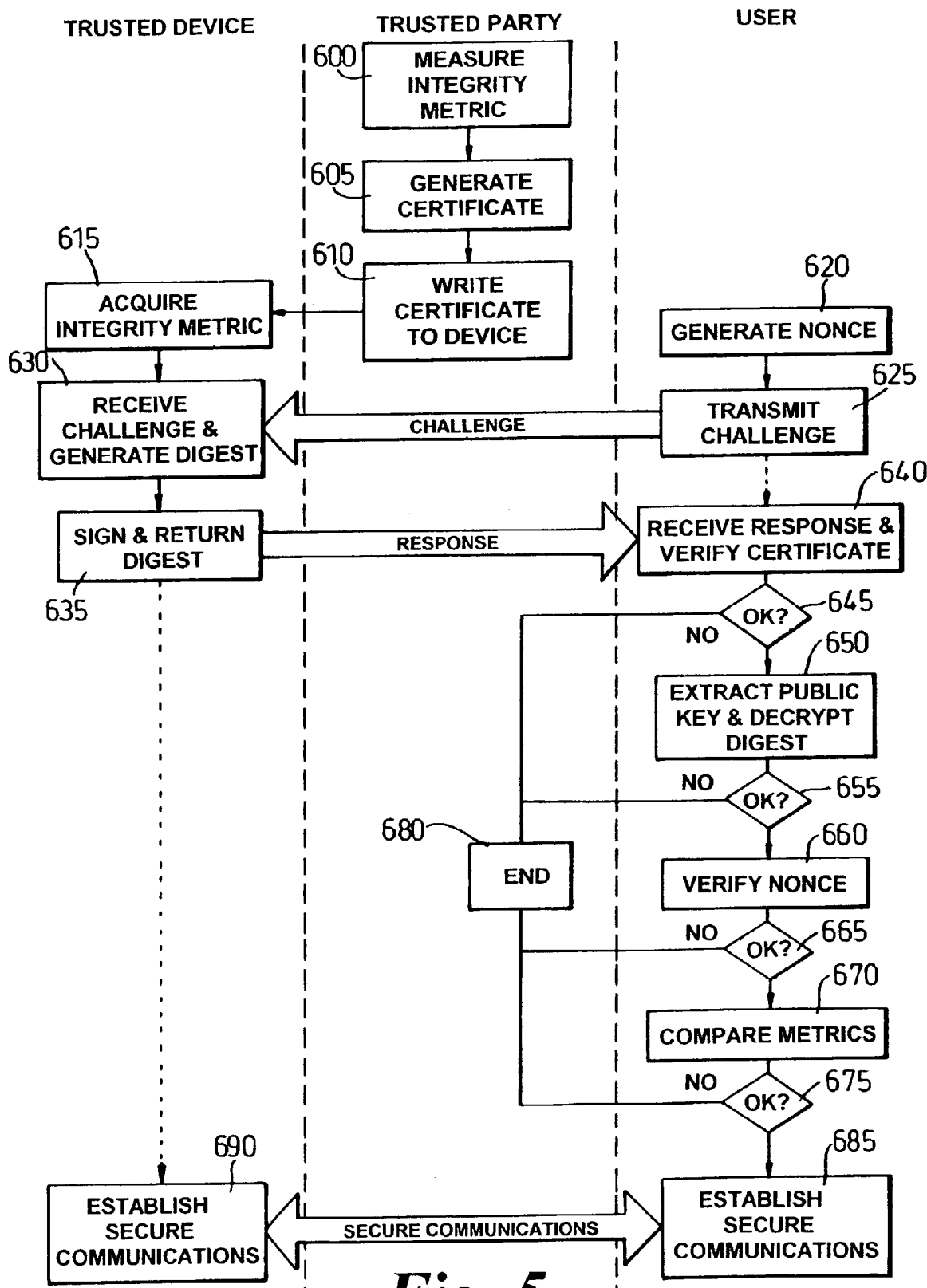
FIG. 5 shows a process for verifying the integrity of a trusted platform.

FIG. 5 illustrates the flow of actions by a TP, the trusted device 260 incorporated into a platform, and a user (of a remote platform) who wants to verify the integrity of the trusted platform. It will be appreciated that substantially the same steps as are depicted in FIG. 5 are involved when the user is a local user. In either case, the user would typically rely on some form of software application to enact the verification. It would be possible to run the software application on the remote platform or the trusted platform. However, there is a chance that, even on the remote platform, the software application could be subverted in some way. Therefore, it is anticipated that, for a high level of integrity, the software application would reside on a smart card of the user, who would insert the smart card into an appropriate reader for the purposes of verification. FIG. 5 illustrates the flow of actions for the general case—a more specific flow of actions for verification by a user smart card will be described with reference to FIG. 6 further below.

At the first instance, a TP, which vouches for trusted platforms, will inspect the type of the platform to decide whether to vouch for it or not. This will be a matter of policy. If all is well, in step 600, the TP measures the value of integrity metric of the platform. Then, the TP generates a certificate, in step 605, for the platform. The certificate is generated by the TP by appending the trusted device's public key, and optionally its ID label, to the measured integrity metric, and signing the string with the TP's private key.

The trusted device 260 can subsequently prove its identity by using its private key to process some input data received from the user and produce output data, such that the input/output pair is statistically impossible to produce without knowledge of the private key. Hence, knowledge of the private key forms the basis of identity in this case. Clearly, it would be feasible to use symmetric encryption to form the basis of identity. However, the disadvantage of using symmetric encryption is that the user would need to share his secret with the trusted device. Further, as a result of the need to share the secret with the user, while symmetric encryption would in principle be sufficient to prove identity to the user, it would insufficient to prove identity to a third party, who could not be entirely sure the verification originated from the trusted device or the user.

In step 610, the trusted device 260 is initialised by writing the certificate into the appropriate non-volatile memory locations of the trusted device 260. This is done, preferably, by secure communication with the trusted device 260 after it is installed in the motherboard 215. The method of writing the certificate to the trusted device 260 is analogous to the method used to initialise smart cards by writing private keys thereto. The secure communications is supported by a 'master key', known only to the TP, that is written to the trusted device (or smart card) during manufacture, and used to enable the writing of data to the trusted device 260; writing of data to the trusted device 260 without knowledge of the master key is not possible.

At some later point during operation of the platform, for example when it is switched on or reset, in step 615, the trusted device 260 acquires and stores the integrity metric of the platform.

When a user wishes to communicate with the platform, in step 620, he creates a nonce, such as a random number, and, in step 625, challenges the trusted device 260 (the operating system of the platform, or an appropriate software application, is arranged to recognise the challenge and pass it to the trusted device 260, typically via a BIOS-type call, in an appropriate fashion). The nonce is used to protect the user from deception caused by replay of old but genuine signatures (called a 'replay attack') by untrustworthy platforms. The process of providing a nonce and verifying the response is an example of the well-known 'challenge/response' process.

In step 630, the trusted device 260 receives the challenge and creates an appropriate response. This may be a digest of the measured integrity metric and the nonce, and optionally its ID label. Then, in step 635, the trusted device 260 signs the digest, using its private key, and returns the signed digest, accompanied by the certificate $Cert_{DP}$, to the user.

In step 640, the user receives the challenge response and verifies the certificate using the well known public key of the TP. The user then, in step 650, extracts the trusted device's 260 public key from the certificate and uses it to decrypt the signed digest from the challenge response. Then, in step 660, the user verifies the nonce inside the challenge response. Next, in step 670, the user compares the computed integrity metric, which it extracts from the challenge response, with the proper platform integrity metric, which it extracts from the certificate. If any of the foregoing verification steps fails, in steps 645, 655, 665 or 675, the whole process ends in step 680 with no further communications taking place.

Assuming all is well, in steps 685 and 690, the user and the trusted platform use other protocols to set up secure communications for other data, where the data from the platform is preferably signed by the trusted device 260.

Further refinements of this verification process are possible. It is desirable that the challenger becomes aware, through the challenge, both of the value of the platform integrity metric and also of the method by which it was obtained. Both these pieces of information are desirable to allow the challenger to make a proper decision about the integrity of the platform. The challenger also has many different options available—it may accept that the integrity metric is recognised as valid in the trusted device 260, or may alternatively only accept that the platform has the relevant level of integrity if the value of the integrity metric is equal to a value held by the challenger (or may hold there to be different levels of trust in these two cases).

The techniques of signing, using certificates, and challenge/response, and using them to prove identity, are well known to those skilled in the art of security and therefore need not be described in any more detail herein.

Figure 7:
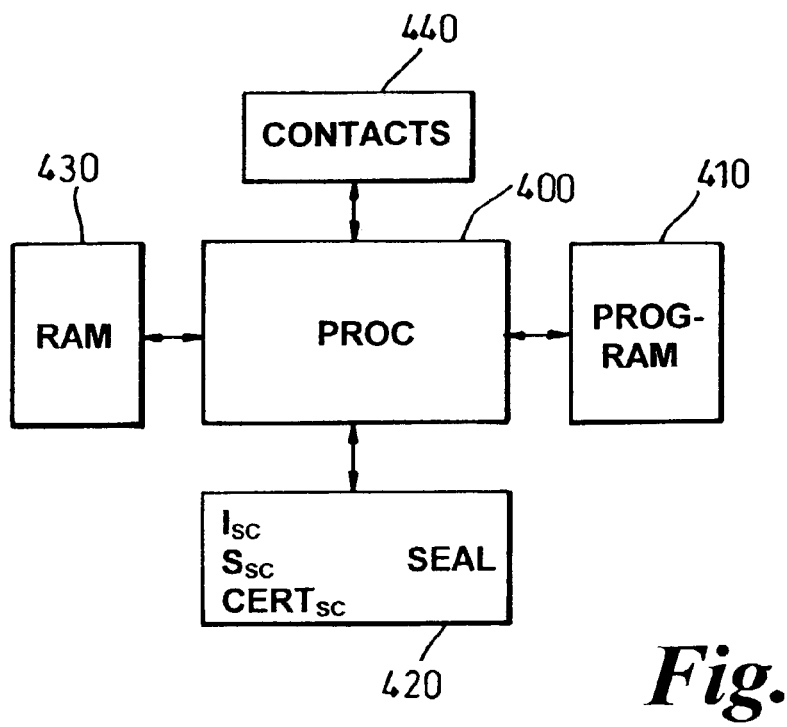
FIG. 7 shows the processing engine of a user smart card suitable for use in the process of FIG. 6.

In preferred arrangements of the system, a user employs a smart card 122 to verify a trusted platform. The processing engine of a smartcard suitable for use in accordance with the preferred embodiment is illustrated in FIG. 7. The processing engine comprises a processor 400 for enacting standard encryption and decryption functions, to support verification of information received from elsewhere. In the present embodiment, the processor 400 is an 8-bit microcontroller, which has a built-in operating system and is arranged to communicate with the outside world via asynchronous protocols specified through ISO 7816-3, 4, T=0, T=1 and T=14 standards. The smartcard also comprises non-volatile memory 420, for example flash memory, containing an identifier $I_{SC}$ of the smartcard 122, a private key $S_{SC}$, used for digitally signing data, and a certificate $Cert_{SC}$, provided by a trusted third party certification agency, which binds the smartcard with public-private key pairs and includes the corresponding public keys of the smartcard 122 (the same in nature to the certificate $Cert_{DP}$ of the trusted device 260). Further, the smartcard contains 'seal' data SEAL in the non-volatile memory 420, which can be represented graphically by the trusted display processor 260 to indicate to the user that a process is operating securely with the user's smartcard, as will be described in detail below. In the present embodiment, the seal data SEAL is in the form of an image pixmap, which was originally selected by the user as a unique identifier, for example an image of the user himself, and loaded into the smartcard 122 using well-known techniques. The processor 400 also has access to volatile memory 430, for example RAM, for storing state information (such as received keys) and providing a working area for the processor 400, and an interface 440, for example electrical contacts, for communicating with a smart card reader.

Seal images can consume relatively large amounts of memory if stored as pixmaps. This may be a distinct disadvantage in circumstances where the image needs to be stored on a smartcard 122, where memory capacity is relatively limited. The memory requirement may be reduced by a number of different techniques. For example, the seal image could comprise: a compressed image, which can be decompressed by the trusted device 260; a thumb-nail image that forms the primitive element of a repeating mosaic generated by the trusted device 260; a naturally compressed image, such as a set of alphanumeric characters, which can be displayed by the trusted device 260 as a single large image, or used as a thumb-nail image as above. In any of these alternatives, the seal data itself may be in encrypted form and require the trusted device 260 to decrypt the data before it can be displayed. Alternatively, the seal data may be an encrypted index, which identifies one of a number of possible images stored by the host computer 100 or a network server. In this case, the index would be fetched by the trusted device 260 across a secure channel and decrypted in order to retrieve and display the correct image. Further, the seal data could comprise instructions (for example PostScript™ instructions) that could be interpreted by an appropriately programmed trusted device 260 to generate an image.

Figure 6:
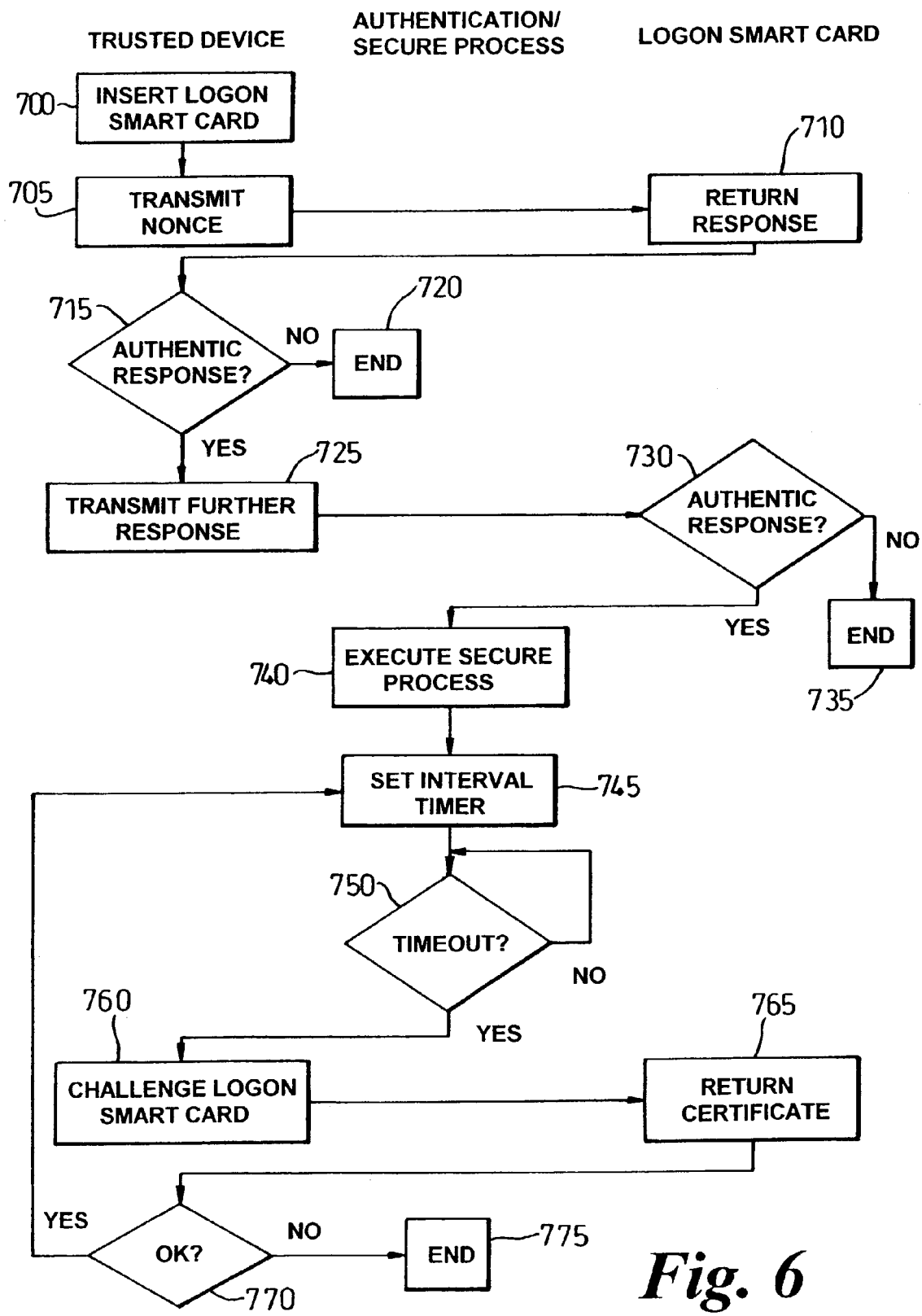
FIG. 6 shows a process for verifying the integrity of a trusted platform by a user with a smart card.

As indicated above, FIG. 6 shows the flow of actions in an example of verification of platform integrity by a user interacting with the trusted platform with a smart card 122. As will be described, the process conveniently implements a challenge/response routine. There exist many available challenge/response mechanisms. The implementation of an authentication protocol used in the present embodiment is mutual (or 3-step) authentication, as described in ISO/IEC 9798-3, "Information technology—Security Techniques—Entity authentication; Part 3: Mechanisms using digital signature techniques", International Organization for Standardization, 1998. Of course, there is no reason why other authentication procedures cannot be used, for example 2-step or 4-step, as also described in this reference.

Initially, the user inserts their smart card 122 into the smart card reader 120 of the platform in step 700.

Beforehand, a platform configured for use by users of in this way will typically be operating under the control of its standard operating system and executing the authentication process, which waits for a user to insert their smart card 122. Apart from the smart card reader 120 being active in this way, such a platform is typically rendered inaccessible to users by 'locking' the user interface (i.e. the screen, keyboard and mouse).

When the smart card 122 is inserted into the smart card reader 120, the trusted device 260 is triggered to attempt mutual authentication in step by generating and transmitting a nonce A to the smart card 122 in step 705. A nonce, such as a random number, is used to protect the originator from deception caused by replay of old but genuine responses (called a 'replay attack') by untrustworthy third parties.

In response, in step 710, the smart card 122 generates and returns a response comprising the concatenation of: the plain text of the nonce A, a new nonce B generated by the smart card 122, an ID of the trusted device 260 and some redundancy; the signature of the plain text, generated by signing the plain text with the private key of the smart card 122; and a certificate containing the ID and the public key of the smart card 122.

The trusted device 260 authenticates the response by using the public key in the certificate to verify the signature of the plain text in step 715. If the response is not authentic, the process ends in step 720. If the response is authentic, in step 725 the trusted device 260 generates and sends a further response including the concatenation of: the plain text of the nonce A, the nonce B, an ID of the smart card 122 and the acquired integrity metric; the signature of the plain text, generated by signing the plain text using the private key of the trusted device 260; and the certificate comprising the public key of the trusted device 260 and the authentic integrity metric, both signed by the private key of the TP.

The smart card 122 authenticates this response by using the public key of the TP and comparing the acquired integrity metric with the authentic integrity metric, where a match indicates successful verification, in step 730. If the further response is not authentic, the process ends in step 735.

If the procedure is successful, both the trusted device 260 has authenticated the smart card 122 and the smart card 122 has verified the integrity of the trusted platform and, in step 740, the authentication process executes the secure process for the user.

In certain types of interaction, the authentication process can end at this point. However, if a session is to be continued between the user and the trusted platform, it is desirable to ensure that the user remains authenticated to the platform.

Where continued authentication is required, the authentication process sets an interval timer in step 745. Thereafter, using appropriate operating system interrupt routines, the authentication process services the interval timer periodically to detect when the timer meets or exceeds a predetermined timeout period in step 750.

Clearly, the authentication process and the interval timer run in parallel with the secure process. When the timeout period is met or exceeded, the authentication process triggers the trusted device 260 to re-authenticate the smart card 122, by transmitting a challenge for the smart card 122 to identify itself in step 760. The smart card 122 returns a certificate including its ID and its public key in step 765. In step 770, if there is no response (for example, as a result of the smart card 122 having been removed) or the certificate is no longer valid for some reason (for example, the smart card has been replaced with a different smart card), the session is terminated by the trusted device 260 in step 775. Otherwise, in step 770, the process from step 745 repeats by resetting the interval timer.

Additionally, or alternatively, in some embodiments it may be required that the user profile is encrypted and signed to protect privacy and integrity. If so, a secure data transfer protocol may be needed between the trusted device 260 and the smart card 122. There exist many available mechanisms for transferring secure credentials between two entities. A possible implementation, which may be used in the present embodiment, is secure key transport mechanisms from ISO/IEC DIS 11770-3, "Information technology—Security techniques—Key management—Part 3: Mechanisms using asymmetric techniques", International Organization for Standardization, March 1997.

Modifications of this verification process using other well-known challenge and response techniques can easily be achieved by the skilled person. Similarly, alternative verification processes can be used by parties interacting with the platform in a different manner (that is, other than as a user equipped with a smart card).

As described above, the trusted device 260 lends its identity and trusted processes to the host computer and the trusted display processor has those properties by virtue of its tamper-resistance, resistance to forgery, and resistance to counterfeiting. Only selected entities with appropriate authentication mechanisms are able to influence the processes running inside the trusted device 260. Neither an ordinary user of the host computer, nor any ordinary user or any ordinary entity connected via a network to the host computer may access or interfere with the processes running inside the trusted device 260. The trusted device 260 has the property of being "inviolate".

It will be apparent from FIG. 3 that the frame buffer memory 315 is only accessible by the trusted display processor 260 itself, and not by the CPU 200. This is an important feature of the preferred embodiment, since it is imperative that the CPU 200, or, more importantly, subversive application programs or viruses, cannot modify the pixmap during a trusted operation. Of course, it would be feasible to provide the same level of security even if the CPU 200 could directly access the frame buffer memory 315, as long as the trusted display processor 260 were arranged to have ultimate control over when the CPU 200 could access the frame buffer memory 315. Obviously, this latter scheme would be more difficult to implement.

A typical process by which graphics primitives are generated by a host computer 100 will now be described by way of background. Initially, an application program, which wishes to display a particular image, makes an appropriate call, via a graphical API (application programming interface), to the operating system. An API typically provides a standard interface for an application program to access specific underlying display functions, such as provided by Windows NT™, for the purposes of displaying an image. The API call causes the operating system to make respective graphics driver library routine calls, which result in the generation of graphics primitives specific to a display processor, which in this case is the trusted display processor 260. These graphics primitives are finally passed by the CPU 200 to the trusted display processor 260. Example graphics primitives might be 'draw a line from point x to point y with thickness z' or 'fill an area bounded by points w, x, y and z with a colour a'.

The control program of the microcontroller 300 controls the microcontroller to provide the standard display functions to process the received graphics primitives, specifically:

receiving from the CPU 200 and processing graphics primitives to form pixmap data which is directly representative of an image to be displayed on the VDU 105 screen, where the pixmap data generally includes intensity values for each of the red, green and blue dots of each addressable pixel on the VDU 105 screen;

storing the pixmap data into the frame buffer memory 315; and periodically, for example sixty times a second, reading the pixmap data from the frame buffer memory 315, converting the data into analogue signals using the video DAC and transmitting the analogue signals to the VDU 105 to display the required image on the screen.

Apart from the standard display functions, the control program includes a function to mix display image data deceived from the CPU 200 with trusted image data to form a single pixmap. The control program also manages interaction with the cryptographic processor.

The trusted display processor 260 forms a part of the overall 'display system' of the host computer 100; the other parts typically being display functions of the operating system, which can be 'called' by application programs and which access the standard display functions of the graphics processor, and the VDU 105. In other words, the 'display system' of a host computer 100 comprises every piece of hardware or functionality which is concerned with displaying an image.

An embodiment of the present invention, which utilises trusted platform technology as described above with reference to FIGS. 1 to 7, will now be described with reference to FIGS. 9 and 10. Firstly, a conventional model for purchase of goods on the Internet will be described with reference to FIG. 8.

Figure 8:
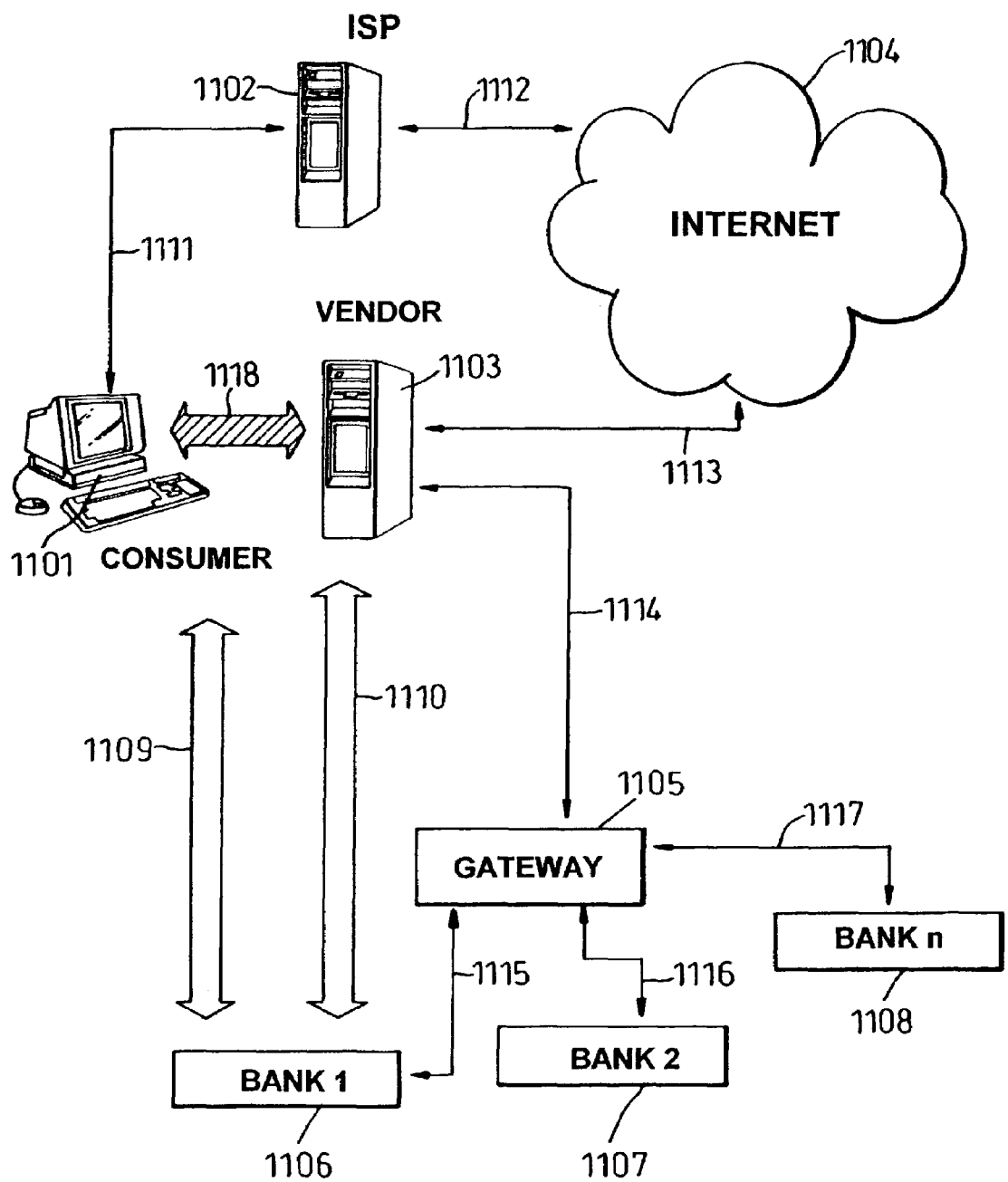
FIG. 8 shows a conventional electronic commerce system.

FIG. 8 is a diagram that illustrates an example of the existing model of purchase goods over the Internet. A consumer 101 has a trusted relationship (typically, as a registered customer) 109 with Bank 1 106. The consumer may be, for example, a credit card holder and the bank issues the card. A vendor 103 also has a trust relationship 110 with Bank 1 106 i.e. the vendor is a client of the bank. When the consumer 101 wants to buy goods from the vendor 103, he contacts the vendor via an Internet service provider (ISP) 102, 111 and the communications is over the Internet 104, 112, 113. The vendor 103 then contacts Bank 1 106 via a gateway 105, 114, 115 to authorise the payment from the consumer's account. If the check is successful the vendor will deliver the goods to the consumer 118.

Figure 9:
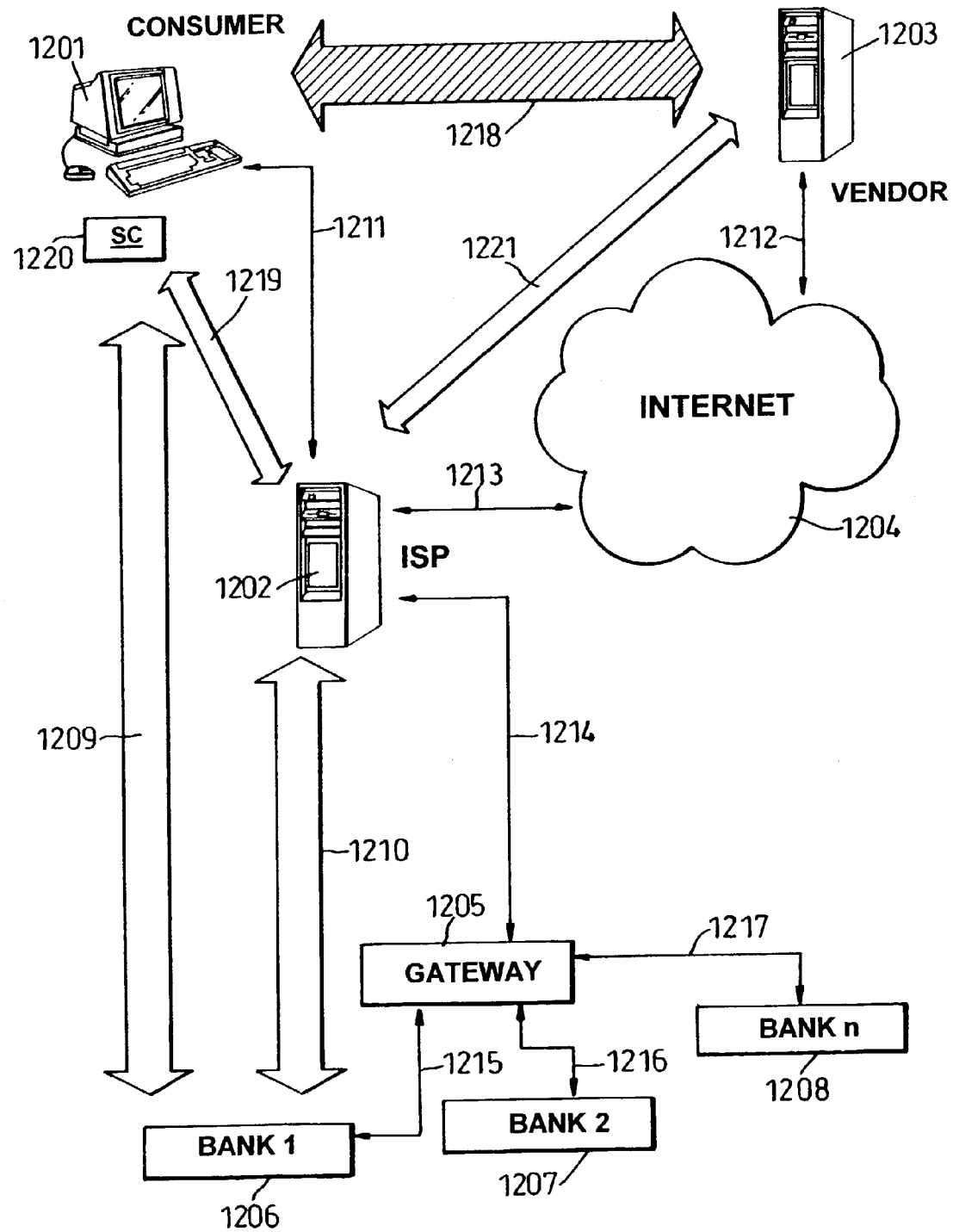
FIG. 9 shows an electronic commerce system according to an embodiment of the present invention.

FIG. 9 is a diagram that illustrates a different model according to an embodiment of the present invention. A consumer 1201 has a trust relationship 1209 with Bank 1 1206. The consumer is a credit card holder and the bank issues the card. In addition, the consumer 1201 has another trust relationship 1219 with an ISP 1202 in this case the consumer holds a trust token (here, smart card 1220) issued by the ISP 1202. With this smart card, the consumer is able to check the integrity of the ISP platform 1202 and the ISP is able to check the identity of the consumer 1201 essentially as described above with reference to FIG. 5 (in particular). The ISP 1201 has a trust relationship 1210 with Bank 1 1206 as it is a client of the bank. The ISP 1202 also has a trust relationship 1221 with a vendor 1203. When the consumer 1201 wants to buy goods from the vendor 1203, he contacts the ISP 1202, 1211, checks the integrity of the ISP platform and gets a temporary identity and session key from the ISP. The consumer then contacts the vendor 1203 by using this temporary identity and session key. Because of the trust relationship with the ISP the vendor is able to verify whether the ISP issued the temporary identity and session key or not. If asked to authorise a transaction, the ISP 1202 contacts Bank 1206 via a gateway 1205, 1214, 1215 to authorise the payment from the consumer's account. If the verification is successful, the vendor will deliver the goods to the consumer 1218.

Figure 10:
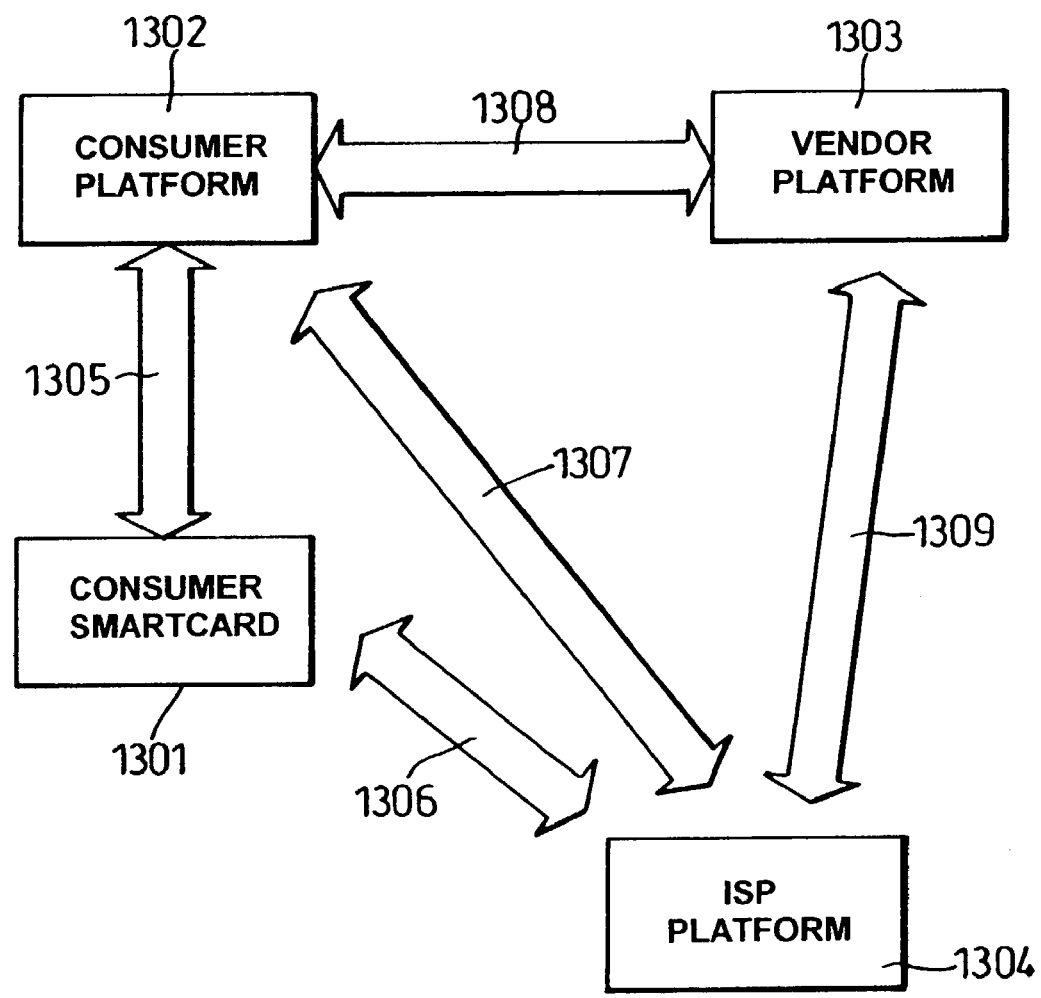
FIG. 10 shows trust relationships in the system of FIG. 9.

FIG. 10 is a diagram that illustrates the trust relationships between the different entities involved in the preferred embodiment of the present invention. Initially a trust relationship 1305 is set up between the consumer smart card 1301 and the consumer platform 1302. The next step is to set up a trust relationship 1306 between the consumer smart card 1301 and the ISP platform 1304. These two trust relationships are combined to establish a trust relationship 1307 between the consumer platform 1302 and the ISP platform 1304. Independently a trust relationship 1309 is set up between the vendor platform 1303 and the ISP platform 1304. These two trust relationships are combined to establish a trust relationship 1308 between the vendor platform 1303 and the consumer platform 1302.

While, as the skilled person will appreciate, the ideas of the invention have broader application for ease of discussion preferred embodiments are considered. In such preferred embodiments, smart cards are the security tokens held by consumers which interact with a trusted computing platform. The consumer platform connects with another trusted computing platform acting as an ISP (a broker) during the registration and payment procedures, and connects with the third trusted computing platform acting as a vendor. The following is an example of a scenario:

A trusted computing platform (e.g. a desktop PC) is based in a public place such as a coffee-house. A consumer wishes to buy some electronic goods (e.g. tickets, a newspaper, a magazine or music) which are supplied by the vendor. The public desktop PC runs continually so that any user may access the services provided. An icon depicting the service of purchasing electronic goods is offered.

If the consumer double-clicks on this icon with a mouse, a window appears asking him to insert his smart card or else cancel the request. If the consumer inserts his smart card into the reader, in a preferred arrangement an image with a special seal generated by the smart card and previously unknown to the PC is displayed on the screen, confirming to the consumer that the smart card is satisfied that the local PC can be trusted (using the functionality of a trusted display processor and a smart card seal image discussed above with reference to FIGS. 1 to 7). Optionally, this special image can further confirm to the consumer that the smart card is satisfied that the remote ISP platform can be trusted as well.

The consumer uses his favourite web browser (e.g. Internet Explorer or Netscape) to access the vendor's home page and to search for information of the particular goods he needs. After finding goods of a satisfactory price and quality, the consumer clicks, using the mouse, on a "Buy Now" icon. Then, an image with another special seal, again generated by the smart card and previously unknown to the PC, is displayed on the screen, confirming to the consumer that the smart card knows the price and product information. Associated with this image is a button, probably a hardware switch that the consumer must press in order to authorise continuing the procedure of purchasing goods. In response to pressing the button, the electronic goods are transferred to the PC. The consumer is able to read it or copy it to his floppy disk or send it to his home PC, but only with his smart card still inserted into the smart card reader.

In this preferred arrangement, there are five entities involved in the procedure of purchasing goods. They are an off-line certificate authority (CA), a consumer with a smart card (SC, for which name is User), a local PC (e.g. a public consumer PC) with a trusted component (TC1), a remote ISP platform with a trusted component (TC2) and a remote vendor platform with a trusted component (TC3). The architecture and functionality of the trusted component and of the smart card are as discussed above with reference to FIGS. 1 to 7.

For the purpose of authentication and key distribution, each entity has the following asymmetric key pairs: that CA has a RSA key pair for signature and verification, that SC has a RSA key pair for signature and verification and each of TC1, TC2 and TC3 has two RSA key pairs respectively for signature-verification and encryption-decryption.

The following assumptions are made for trust relationships among the above entities:

SC, TC1, TC2 and TC3 know the public key of CA, and they believe that only CA knows the corresponding private key and this key pair is valid.

TC1, TC2 and TC3 hold certificates of their own public keys issued by CA.

SC holds a certificate of its own public key either issued by TC2 whose corresponding certificate is issued by CA or (optionally) issued by CA directly.

SC, TC1, TC2 and TC3 believe that any of the other entities that knows a private key corresponding to a certificate issued by CA, would follow the protocol properly.

A preferred protocol for implementing the preferred embodiment of the present invention is described blow. In the protocol, the following notations will be used:

$CMD_n$—the $n_{th}$ command which is used to indicate different services, probably including the product description, service type, price, payment method, etc.

$N_{n-X}$—the $n_{th}$ nonce generated by the entity X(X={SC, TC1, TC2, TC3});

$S_x(m)$—a signature on a data element m signed with a private signature key of the entity X(X={SC, TC1, TC2, TC3});

$E_X(m)$—a data element m encrypted by using the public encryption key of the entity X(X={TC1, TC2, TC3});

A→B: m—a data element m is transferred from entity A (A={SC, TC1, TC2, TC3}) to entity B(B={SC, TC1, TC2, TC3});

m1,m2—a concatenation of two data elements m1 and m2;

TID—the temporary identity of TC1 used for one purchasing session;

SK1, SK2—symmetric keys used for one purchasing session;

$E'_K(m)$—a data element m encrypted via a symmetric encryption algorithm by using the key K;

Cert(X, Y)—a certificate of the entity X's public key issued by the CA for the purpose Y, where X={SC, TC1, TC2, TC3} and Y={V, E} (V—verification and E—encryption). For simplicity, Cert(A)=Cert(X, V), where X={SC}, and Cert(X)=Cert(X, V), Cert(X, E), where X={TC1, TC2, TC3}; and $IM_X$—the integrity metrics of the platform with X(X={TC1, TC2, TC3}). The technique of integrity check of a trusted computing platform was disclosed in the prior patent application EP 99301100.6.

The protocol

Part 1 (TC2 and TC3 authenticate each other and check each other's integrity of platforms)

| 1. TC3 → TC2: | $CMD_1$, $N_{1-TC3}$, Cert(TC3) |
|---|---|

TC3 initiates the authentication protocol by sending TC2 a command $CMD_1$, a newly generated nonce $N_{1-TC3}$ and its certificate Cert(TC3) (if TC2 hasn't got this certificate yet).

| 2. TC2 → TC3: | $N_{2-TC2}$, $IM_{TC2}$, Cert(TC2), $S_{TC2}(CMD_1, N_{1-TC3}, N_{2-TC2}, TC3, IM_{TC2})$ |
|---|---|

Upon receipt of Message 1, TC2 replies TC3 with another newly generated nonce $N_{2-TC2}$, the integrity metric of the ISP platform $IM_{TC2}$, its certificate Cert(TC2) (if TC3 hasn't got this certificate yet) and a signature on a concatenation of $CMD_1$, $N_{1-TC3}$, $N_{2-TC2}$, TC3 and $IM_{TC2}$, i.e. $S_{TC2}(CMD_1, N_{1-TC3}, N_{2-TC2}, TC3, IM_{TC2})$.

| 3. TC3 → TC2: | $IM_{TC3}$, $S_{TC3}(CMD_1, N_{2-TC2}, N_{1-TC3}, TC2, IM_{TC3})$ |
|---|---|

After receiving Message 2, TC3 verifies the signature by using the certified public key and integrity metric. If the verification is successful, TC3 replies TC2 with the integrity metric of the vendor platform $IM_{TC3}$ and a signature on a concatenation of $CMD_1$, $N_{2-TC2}$, $N_{1-TC3}$, TC2 and $IM_{TC3}$, i.e. $S_{TC3}(CMD_1, N_{2-TC2}, N_{1-TC3}, TC2, IM_{TC3})$. TC2 then verifies this signature in the same way. If the verification passes, TC2 and TC3 complete the authentication and integrity check.

This part of the protocol can be run when the ISP platform and the vendor platform start communicating to each other, and also can repeat during their communications.

Part 2 (authentication amongst SC, TC1 and TC2, integrity check of platforms with TC1 and TC2, and establishment of a temporary identity for TC1 and two session keys)

The consumer inserts the smart card in the consumer PC to make a purchase request, then

| 4. TC1 → SC: | $CMD_2$, $N_{3-TC1}$, Cert(TC1) |
|---|---|

TC1 initiates this part of the protocol by sending SC a command $CMD_2$, a newly generated nonce $N_{3-TC1}$, and its certificate Cert(TC1) (if SC hasn't got this certificate yet).

| 5. SC → TC1: | $N_{4-SC}$, TC2, Cert(SC) |
|---|---|

Upon receipt of Message 4, SC replies TC1 with another newly generated nonce $N_{4-SC}$, the name of TC2 and its certificate Cert(SC) (if TC1 hasn't got this certificate yet). After receiving Message 5, the consumer PC connects to the remote ISP server, then

| 6. TC2 → TC1: | $N_{5-TC2}$, Cert(TC2) |
|---|---|

TC2 replies TC1 with a newly generated nonce $N_{5-TC2}$ and its certificate Cert(TC2) (if TC1 hasn't got this certificate yet).

| 7. TC1 → TC2: | $CMD_2$, $N_{4-SC}$, Cert(SC), Cert(TC1) |
|---|---|

To reply Message 6, TC1 sends TC2 the command $CMD_2$, the nonce $N_{4-SC}$ and a certificate Cert(SC) forwarded from SC's message and its own certificate Cert(TC1) (if TC2 does not have this certificate).

| 8. TC2 → TC1: | $IM_{TC2}$, $E_{TC1}(TID, SK1)$, $S_{TC2}(CMD_2, N_{4-SC}, N_{5-TC2}, User, TC1, IM_{TC2}, E_{TC1}(TID, SK1))$ |
|---|---|

Upon receipt of Message 7, TC2 generates a random number as a temporary identity of TC1, TID, and another random number as a session key, SK1, and sends them to TC1 with the integrity metric of the ISP platform $IM_{TC2}$ and a signature $STC_2(CMD_2, N_{4-SC}, N_{5-TC2}, User, TC1, IM_{TC2}, E_{TC1}(TID, SK1))$.

| 9. TC1 → SC: | $N_{5-TC2}$, $IM_{TC1}$, $IM_{TC2}$, Cert(TC2), $E_{TC2}(SK2)$, $S_{TC1}(CMD_2, N_{4-SC}, N_{3-TC1}, User, TC2, IM_{TC1}, E_{TC2}(SK2))$, $E_{TC1}(TID, SK1)$, $S_{TC2}(CMD_2, N_{4-SC}, N_{5-TC2}, User, TC1, IM_{TC2}, E_{TC1}(TID, SK1))$ |
|---|---|

After receiving Message 8, TC1 generates a random number as another session key which will be used to establish a secure channel between the consumer platform and the ISP platform, and then sends Message 9 to SC.

| 10. SC → TC1: | $S_{SC}(CMD_2, N_{3-TC1}, N_{5-TC2}, N_{4-SC}, TC1, TC2,$ $E_{TC1}(TID, SK1), E_{TC2}(SK2))$ |
|---|---|

Upon receipt of Message 9, SC verifies both signatures signed by TC1 and TC2 for two purposes of authentication and integrity check. If the verification passes, SC makes a signature $S_{SC}(CMD_2, N_{3-TC1}, N_{5-TC2}, N_{4-SC}, TC1, TC2, E_{TC1}(TID, SK1), E_{TC2}(SK2))$ including all the nonces being used in this session and two encrypted data respectively for TC1 and TC2. Note that although SC is not able to decrypt these two encrypted data values it can verify that they have been included in the signatures signed by TC1 or TC2. SC sends this signature to TC1.

| 11. TC1 → TC2: | $E_{TC2}(SK2),$ $S_{SC}(CMD_2, N_{3-TC1}, N_{5-TC2}, N_{4-SC}, TC1, TC2,$ $E_{TC1}(TID, SK1), E_{TC2}(SK2))$ |
|---|---|

After receiving Message 10, TC1 forwards the signature to TC2 with an encrypted session key $E_{TC2}(SK2)$. Then both TC1 and TC2 will verify SC's signature and decrypt the secret information. If this part of the protocol succeeds, TC1 and TC2 will share three secret data values TID, SK1 and SK2.

Part 3 (purchase by using the temporary identity with on-line service provided by TC2)

The consumer PC contacts the vendor platform to make a purchase request in the following way.

| 12. TC1 → TC3: | $CMD_3$ $N_{6-TC1},$ $TC2,$ $E_{TC2}(CMD_3, TC3, User, TID,$ $S_{TC1}(CMD_3, N_{6-TC1}, User, TC3, TID))$ |
|---|---|

TC1 generates a command $CMD_3$, a nonce $N_{6-TC1}$ and a signature $S_{TC1}(CMD_3, N_{6-TC1}, User, TC3, TID)$ including its temporary identity TID, and encrypts this signature with the public encryption key of TC2. TC1 sends Message 12 to TC3.

| 13. TC3 → TC2: | $CMD_3,$ $N_{7-TC3},$ $N_{6-TC1},$ $TC3,$ $E_{TC2}(CMD_3, N_{6-TC1}, TC3, User, TID,$ $S_{TC1}(CMD_3, N_{6-TC1}, User, TC3, TID))$ |
|---|---|

After receiving Message 12, TC3 is not able to decrypt it to get TC1's signature. TC3 forwards the message to TC2 in Message 13 with a newly generated nonce $N_{7-TC3}$.

| 14. TC2 → TC3: | $E_{TC3}(CMD_3, TID, SK1,$ $S_{TC2}(CMD3, N_{7-TC3}, TID, SK1))$ |
|---|---|

Upon receipt of Message 13, TC2 decrypts it, verifies the signature and checks TID against the list of current temporary identities. If these verification checks all pass, TC2 signs TID and SK1 and encrypts the signature with the public encryption key of TC3 and sends the encryption data to TC3.

| 15. TC3 → TC1: | $N_{8-TC3},$ $E'_{SK1}(CMD_3, N_{6-TC1}, N_{8-TC3}, TID, TC3)$ |
|---|---|

After receiving Message 14, TC3 decrypts it and verifies the signature included. If the verification is successful, it retrieves TID and SK1 as secret information shared with TC1. Then TC3 generates a nonce $N_{8-TC3}$ for challenging TC1 and sends Message 15 to TC1.

| 16. TC1 → SC: | $CMD_3,$ $N_{9-TC1}$ |
|---|---|

After receiving Message 15, TC1 decrypts it by using the shared session key SK1 and checks if the message has the correct format and includes a proper TID and nonce $N_{6-TC1}$. If the check succeeds, TC1 sends Message 16 to SC to get the consumer's confirmation of the purchase. $CMD_3$ includes all information needed for the purchase. Before sending Message 16 the consumer verifies that he wants to continue with the transaction by displaying information contained in $CMD_3$ and using a special confirmation switch (this technique has been disclosed in the prior patent application EP 99304164.9).

| 17. SC → TC1: | $S_{SC}(CMD_3, N_{9-TC1}, TC1)$ |
|---|---|

The SC signs related information and sends this signature to TC1 in Message 17.

| 18. TC1 → TC3: | $E'_{SK1}(CMD_3, N_{8-TC3}, N_{6-TC1}, TC2)$ |
|---|---|

After receiving Message 17 and verifying the signature included, TC1 sends an acknowledgement to TC3.

Note that during the flow of this protocol, if any verification or check is not successful, the corresponding verifier will make an announcement to let the other entities know what happens and then the protocol aborts.

Alternative protocols can be employed without deviating from the present invention. The skilled man will appreciate that the use of hardware to ensure confidence in trusted relationships allows for a particularly effective method for brokering transactions as shown above, by allowing trusted relationships to be leveraged without proliferation of exchanges of personal information.

The invention claimed is:

1. A method of brokering a transaction between a consumer and a vendor by a broker, wherein the consumer, the broker and the vendor are all attached to a public network, the consumer having a secure token containing a true consumer identity and using a computing platform comprising a trusted component adapted for physical and logical protection against interference and containing a secure processor, the method comprising:

authentication between the secure token and the secure processor;

the consumer obtaining a temporary identity from the broker by using the true consumer identity from the secure token;

the consumer selecting a purchase to be made from the vendor;

the consumer requesting the purchase from the vendor and providing the temporary identity to the vendor;

the vendor requesting transaction authorisation from the broker by forwarding the request and the temporary identity to the broker;

the broker matching the temporary identity to a current list of temporary identities, and obtaining the true consumer identity;

the broker providing authorisation for the transaction based on transaction details and true consumer identity.

2. A method as claimed in claim 1, further comprising the step of authentication between the secure token and the broker.

3. A method as claimed in claim 2, further comprising a prior step of the broker providing the secure token to the consumer.

4. A method as claimed in claim 1, further comprising the step of mutual authentication between the broker and the vendor.

5. A method as claimed in claim 1, wherein the broker is an Internet Service Provider.

6. A method as claimed in claim 1, wherein the broker and the vendor each use platforms containing a trusted component adapted for physical and logical protection against interference and containing a secure processor, wherein each such secure processor is adapted for authentication of or by the consumer, the vendor or the broker as appropriate.

7. A method as claimed in claim 6, wherein communication between any of the broker, the vendor, and the secure token is secured under a cryptographic key.

8. A method as claimed in claim 6, wherein each such secure processor is adapted to obtain an integrity metric of its platform, and wherein the method contains the step of one or more of said secure processors requesting and receiving such an integrity metric from one or more of the other secure processors.

9. A method as claimed in claim 1, wherein the broker obtains billing and audit information.

10. A method as claimed in claim 1, wherein the purchase is of digital content, and further comprising the step of the vendor sending the content to the consumer over the public network.

11. A method as claimed in claim 1, wherein the physical address of the consumer is provided to the vendor but financial data personal to the consumer is not provided to the vendor.

12. A method as claimed in claim 1, wherein said secure processor controls the display of the consumer computing platform.

13. A method as claimed in claim 1, wherein said secure token is a smart card.

14. A method of brokering a transaction between a consumer and a vendor by a broker across a communications network, wherein the consumer has a secure token containing a consumer identity recognised by the broker and the consumer and the broker each use computing platforms each comprising a secure processor, the method comprising:

one or more of the secure token and the consumer secure processor authenticating the other;

the consumer provides evidence of the consumer identity to the broker and receives a temporary identity;

the consumer requests a purchase from the vendor and provides the temporary identity to the vendor;

the vendor provides the temporary identity to the broker and requests transaction authorisation;

the broker determines the consumer identity from the temporary identity; and the broker provides authorisation based on the consumer identity.

15. A method as claimed in claim 14, further comprising:

one or both of the secure processors authenticating the other secure processor.

16. A method as claimed in claim 15, further comprising the step that the secure token is a smart card.

17. A method as claimed in claim 16, further comprising the step that one or more of the secure token and the broker authenticates the other.

18. A method as claimed in claim 15, wherein the trusted processor in the consumer computing platform controls a display of the consumer computing platform.

19. A method as claimed in claim 14, further comprising the prior step that the broker provides the secure token to the consumer.

20. A method as claimed in claim 14, wherein each of the secure processors is adapted to obtain an integrity metric of its platform, and wherein the method contains the step that one or more of said secure processors requests and receives such an integrity metric from one or more of the other secure processors.

* * * * *